J. A. VILLOCHI.
TIRE RIM.
APPLICATION FILED JUNE 2, 1920.

1,427,707.

Patented Aug. 29, 1922.
2 SHEETS—SHEET 1.

Witnesses

Inventor
John A. Villochi,
By
Attorney

J. A. VILLOCHI.
TIRE RIM.
APPLICATION FILED JUNE 2, 1920.
1,427,707.
Patented Aug. 29, 1922.
2 SHEETS—SHEET 2.
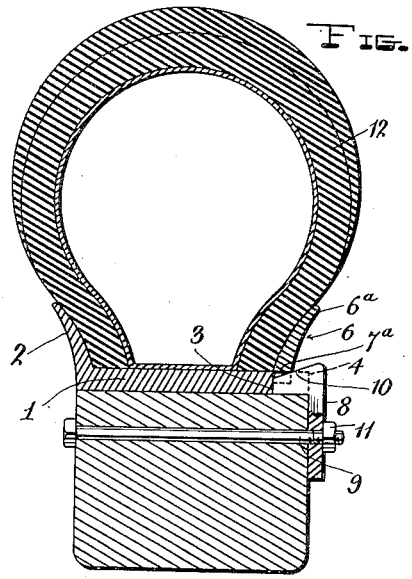
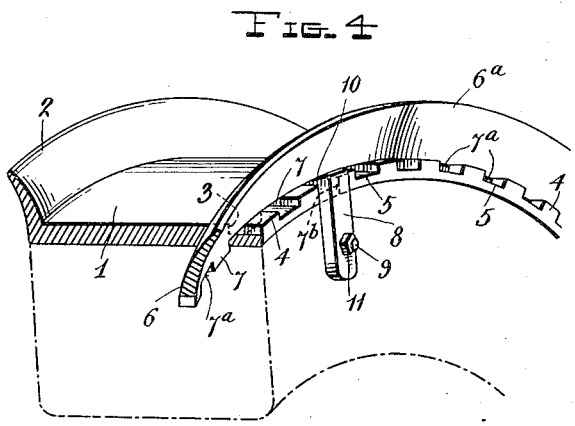
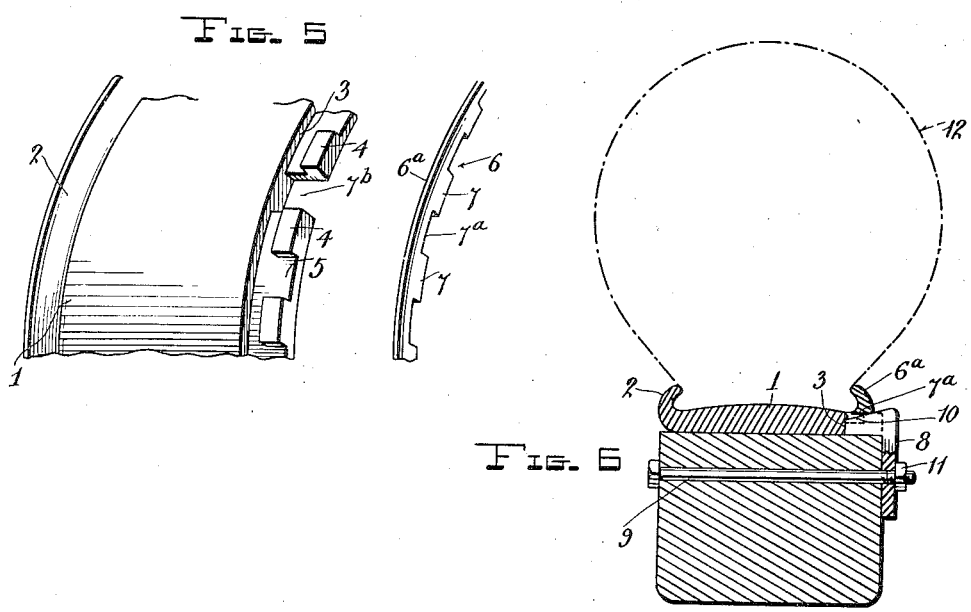
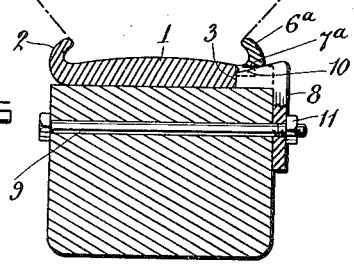
Inventor
John A. Villochi,
By
Attorney
Witnesses

UNITED STATES PATENT OFFICE.

JOHN ANDREW VILLOCHI, OF EASTON, PENNSYLVANIA, ASSIGNOR OF ONE-HALF TO LOUIS J. VILLOCHI, OF EASTON, PENNSYLVANIA.

TIRE RIM.

1,427,707. Specification of Letters Patent. Patented Aug. 29, 1922.

Application filed June 2, 1920. Serial No. 385,927.

*To all whom it may concern:*

Be it known that I, JOHN A. VILLOCHI, a citizen of the United States, residing at Easton, in the county of Northampton and State of Pennsylvania, have invented new and useful Improvements in Tire Rims, of which the following is a specification.

This invention relates to automobile rims and particularly to rims of the sectional type, and the objects are to provide a rim which will operate to securely seat a tire upon the wheel, which shall consist of few parts, in which the rim is not liable to accidental displacement, which is most easily adjusted to its tire-retaining position, and in which the rim is adapted to carry inflated spare tires which may be readily and easily used as replacement tires.

With the above and other objects in view, my invention consists in certain features of structure, combination and relation which will be more fully set forth hereinafter.

I have illustrated one embodiment of my invention in the accompanying drawings, wherein:

Figure 3 is a section through a rim of the straight side type constructed according to my invention.

Figure 4 is a partial perspective view of the type shown in Figure 3.

Figure 5 is a partial perspective view of my improved rim as constructed for a clincher tire.

Figure 6 is a section showing my invention as applied to a rim of the type illustrated in Figure 5.

Referring to the drawings, wherein similar numerals denote like parts throughout the several views:

Figure 1:
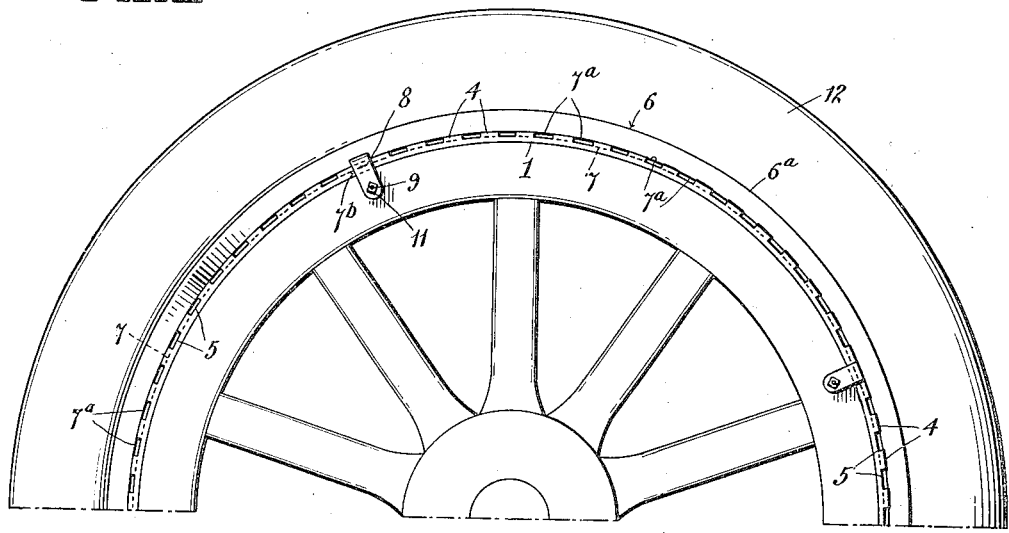
Figure 1 is a side elevation of a vehicle wheel with a rim constructed in accordance with my invention mounted in place thereon.
Figure 2:
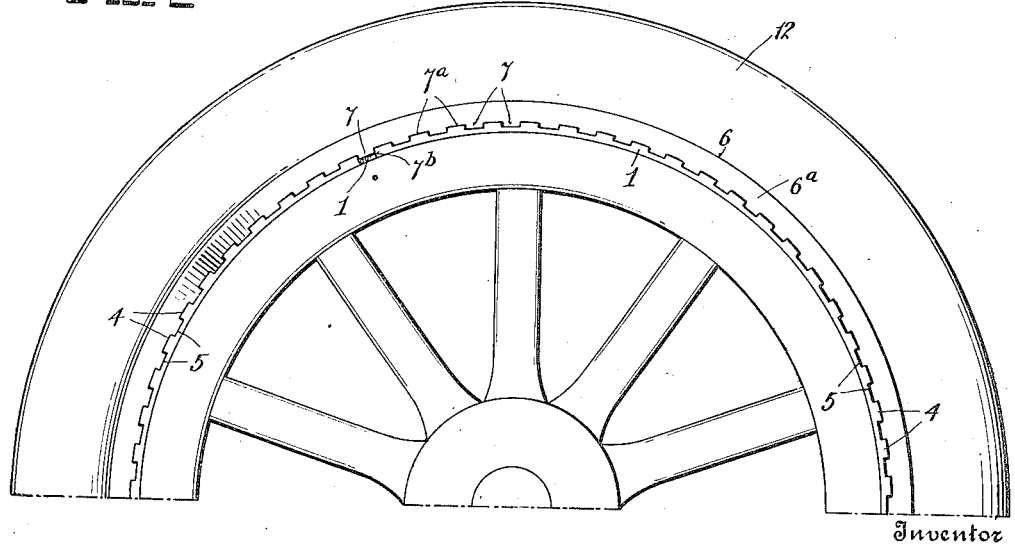
Figure 2 is a similar view with the locking ring removed.

I provide an annular rim member 1. This rim member as illustrated in the various figures of drawings, is formed at one side with an annular tire-retaining flange 2, which may be either of the straight-side or clincher type. At the opposite side of the rim from the retaining flange 2 and in the outer face thereof I provide a circumferential channel 3 and adjacent this channel and forming a part of the outer edge of the rim are a plurality of circumferentially spaced lugs 4. The spacing of these lugs is such as to form transversely extending channels 5 which communicate with the channel 3 hereinbefore referred to. It is, of course, within the contemplation of my invention that instead of using a channel as aforesaid I may form the side of the rim in question with an offset portion and position a plurality of lugs thereon.

I further provide a locking ring 6 which is formed with an inner annular series of lugs 7, these lugs being the same in number as and of length equal to the width of the channels 5 provided between the lugs of the rim member and are so spaced as to provide channels 7$^a$. This locking ring is formed with an annular tire retaining flange 6$^a$ which may be either of the straight-side or clincher type.

As indicated in Figure 5, the channeled portion of the rim is cut away at intervals, as at 7, in order to provide a seating for the rim-locking lugs or key 8. Each lug is pivoted, as at 9, to the felly of the wheel, and is formed with a bevelled or V-shape head 10 which is adapted to take into the recesses or cut-away portion just referred to, the side portions of the head of the locking lug bearing upon the ends of two of the lugs provided on the annular flange member whereby the flange member is secured against rotation. The locking lug is secured in position by means of the nut 11.

As shown in Figure 1 the locking lugs 9 are spaced at intervals around the wheel and the wedge shaped ends 10 serve when equally tightened to hold the ring a short distance away from the bottom of the channel preventing a rust seal from forming therebetween. Should the ring and the sides of the channel become rusted together the wedge shaped lugs on one side of the wheel are tightened and those on the other side loosened which causes a slight bodily sliding of the ring relative to the walls of the channel. This breaks the rust seal and permits ready rotation of the ring to release position.

This structure is adapted for use with any of the known types of tires and for purposes of illustration I show a pneumatic tire designated as 12 in the drawings.

In operation, a tire is seated upon the rim member 1, which rim member may be retained in position on the felly of the wheel by any of the usual and suitable lugs (not shown). It is also within the contemplation of this invention that the rim 1 may be fixed to the wheel in any well known manner. The locking ring 6 is then forced laterally towards the rim member, the lugs on the inner edge of the locking ring passing through the lateral channels in the rim. When the lugs of the locking ring are in position in the channel 3, the ring is turned slightly, whereupon the lugs on the ring will register with the lugs provided on the rim, whereupon the locking lug 8 is turned to a position where its beveled head takes into the recess 7 in the rim, after which the nut 11 may be tightened and the tire thereby secured in place.

I claim:—

In a sectional rim, an annular rim member formed at one side with a tire retaining flange, a circumferential channel in the outer face of said rim member the external side wall of said channel having discontinuous portions forming spaced lugs, a locking ring formed with a tire retaining flange constituting its outer face and provided with spaced lugs on its inner face fitting between the spaced lugs on the rim member, said channel being so shaped as to accommodate said ring lugs behind said rim lugs within said channel when said ring is rotated, and locking means for said ring comprising spaced lugs having wedge shaped ends coacting against the inner circumferential surface of said ring.

In testimony whereof I have hereunto set my hand in presence of two subscribing witnesses.

JOHN ANDREW VILLOCHI.

Witnesses:
A. J. BLEWITT,
J. KURLANSIK.